United States Patent
Quiles et al.

(10) Patent No.: US 12,549,457 B2
(45) Date of Patent: Feb. 10, 2026

(54) CREATING DECENTRALIZED MULTI-PARTY TRACEABILITY OF SLA USING A BLOCKCHAIN

(71) Applicant: Red Hat, Inc., Raleigh, NC (US)

(72) Inventors: Pau Garcia Quiles, Madrid (ES); Sergio Fernando Ocon Cardenas, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 136 days.

(21) Appl. No.: 18/115,217

(22) Filed: Feb. 28, 2023

(65) Prior Publication Data

US 2024/0291730 A1    Aug. 29, 2024

(51) Int. Cl.
*H04L 41/5006* (2022.01)
*H04L 9/40* (2022.01)
*H04L 41/5019* (2022.01)

(52) U.S. Cl.
CPC ...... *H04L 41/5006* (2013.01); *H04L 41/5019* (2013.01); *H04L 63/101* (2013.01)

(58) Field of Classification Search
CPC ... H04L 41/5006; H04L 63/11; H04L 41/5019
See application file for complete search history.

(56) References Cited

U.S. PATENT DOCUMENTS

| | | |
|---|---|---|
| 9,785,369 B1 | 10/2017 | Ateniese et al. |
| 10,833,960 B1 | 11/2020 | Ranchal et al. |
| 10,885,276 B2 | 1/2021 | Kartoun et al. |
| 2012/0158452 A1* | 6/2012 | Shafiee ............ G06Q 10/06316 705/7.26 |
| 2016/0350698 A1* | 12/2016 | Neckowicz .... G06Q 10/063118 |

(Continued)

FOREIGN PATENT DOCUMENTS

CN    112488706 A    3/2021

OTHER PUBLICATIONS

De Brito Gonçalves et al., "Distributed Service-Level Agreement Management with Smart Contracts and Blockchain", 2022, Federal University of Espirito Santo, Vitoria-ES, Brazil.

(Continued)

*Primary Examiner* — Dhairya A Patel
*Assistant Examiner* — Eui H Kim
(74) *Attorney, Agent, or Firm* — Womble Bond Dickinson (US) LLP

(57) ABSTRACT

A system and method of creating decentralized multi-party traceability of service-level agreements (SLAs) using a blockchain. The method including receiving a service request to provide a service according to a first service-level agreement (SLA) associated with a client. The method including generating a first dataset indicating a status associated with a first portion of the service. The method including identifying, based on the first SLA, a second service provider to provide a second portion of the service according to a second SLA. The method including retrieving, from a blockchain system based on the second SLA, a non-fungible token (NFT) associated with a second dataset indicating a status associated with the second portion of the service. The method including granting, by a processing device of a first service provider based on the NFT, access to a client device associated with the client to the first dataset and the second dataset.

14 Claims, 5 Drawing Sheets

(56) References Cited

U.S. PATENT DOCUMENTS

| | | | |
|---|---|---|---|
| 2018/0315055 A1 | 11/2018 | Pickover et al. | |
| 2019/0102850 A1* | 4/2019 | Wheeler | G06Q 20/405 |
| 2020/0169407 A1* | 5/2020 | Wei | H04L 63/10 |
| 2020/0372501 A1* | 11/2020 | Kadarmandalgi | G06Q 30/08 |
| 2022/0343244 A1* | 10/2022 | Yesudas | G06N 5/04 |
| 2023/0368257 A1* | 11/2023 | Grant | G06Q 50/165 |
| 2024/0185223 A1* | 6/2024 | McGarity | H04L 9/3239 |

OTHER PUBLICATIONS

Uriarte et al., "Distributed Service-Level Agreement Management with Smart Contracts and Blockchain", Apr. 14, 2019, IMT School for Advanced Studies Lucca, Italy.

* cited by examiner

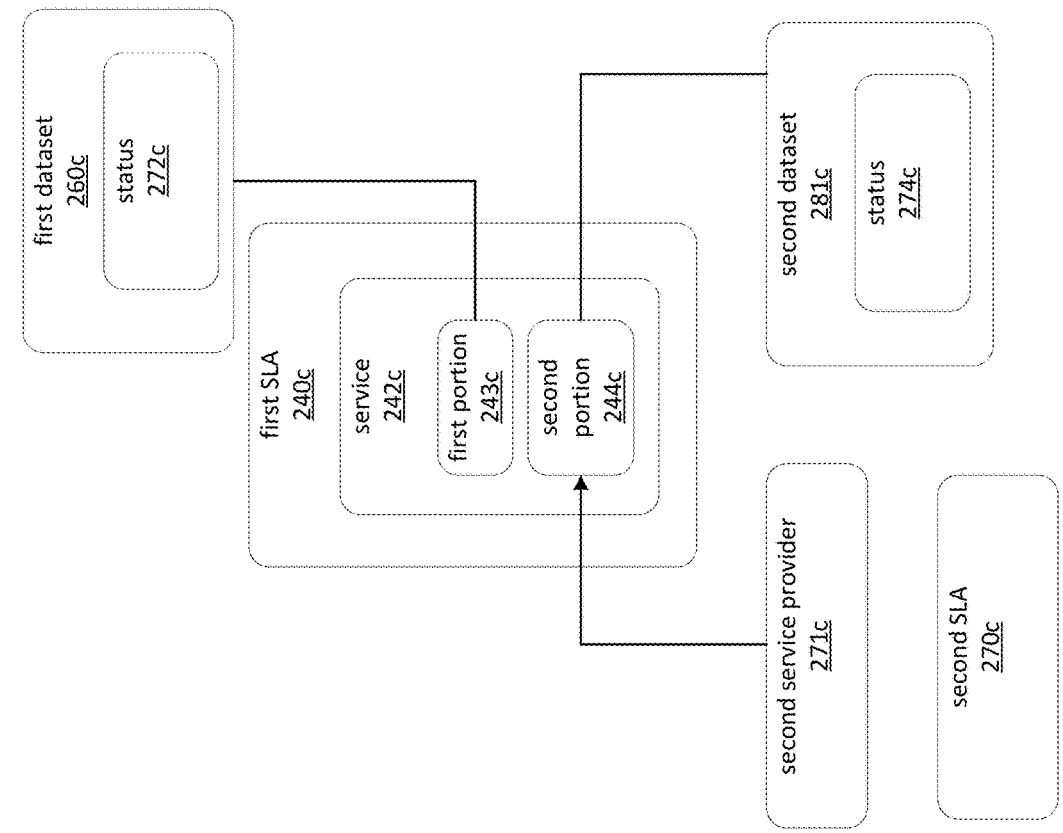
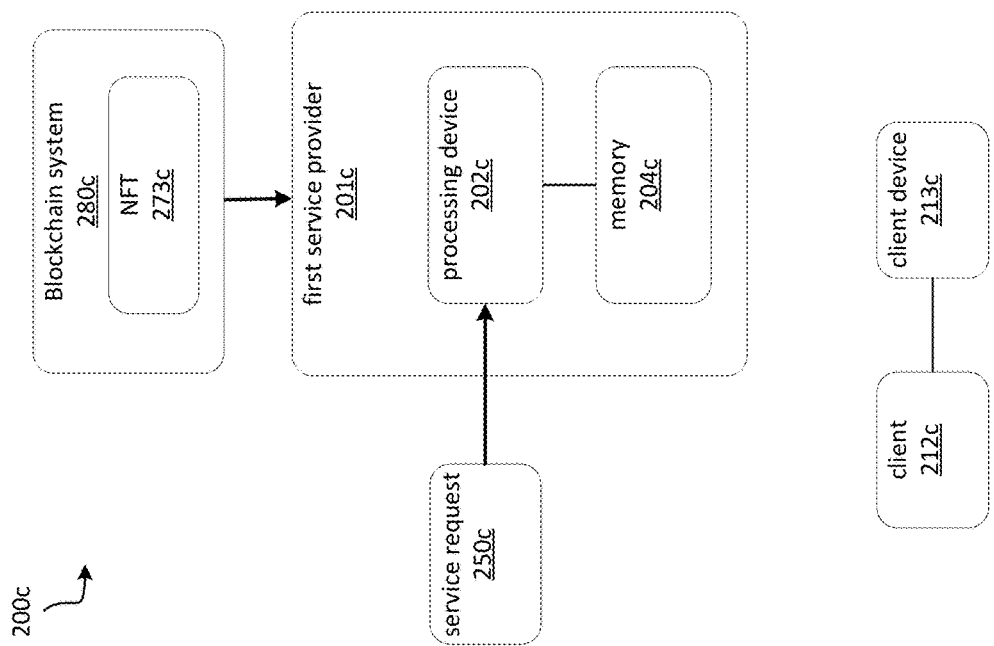
FIG. 2C

300

```
receiving a service request to provide a service according
to a first service-level agreement (SLA) associated with a
client
302
```

```
generating a first dataset indicating a status associated
with a first portion of the service
304
```

```
identifying, based on the first SLA, a second service
provider to provide a second portion of the service
according to a second SLA
306
```

```
acquiring behavioral data indicative of the real-time
behavior of the user-function
308
```

```
granting, by a processing device of a first service provider
based on the NFT, access to a client device associated
with the client to the first dataset and the second dataset
310
```

FIG. 3

CREATING DECENTRALIZED MULTI-PARTY TRACEABILITY OF SLA USING A BLOCKCHAIN

TECHNICAL FIELD

The present disclosure relates generally to software technology, and more particularly, to systems and methods of creating decentralized multi-party traceability of service-level agreements (SLAs) using a blockchain.

BACKGROUND

A service-level agreement (SLA) serves as a documented understanding between the party (e.g., service provider) providing the service and the one (e.g., customer) receiving the benefits of the service. While conventional SLAs define service expectations between vendors and customers, they may also be employed between departments within the same organization. And although the SLA may include as little as a few sentences or as much as entire documents' worth of requirements and conditions, they are often a critical component of modern service contracts. It is also important to note that SLAs should not be thought of as immutable; they should change and grow to meet evolving business demands. Thus, SLAs should incorporate a clear framework for introducing revisions or modifications during the course of the contract.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2C is a block diagram depicting an example environment for using an ITM system, according to some embodiments;

FIG. 3 is a flow diagram depicting a method of creating decentralized multi-party traceability of service-level agreements (SLAs) using a blockchain, according to some embodiments.

DETAILED DESCRIPTION

Figure 1:
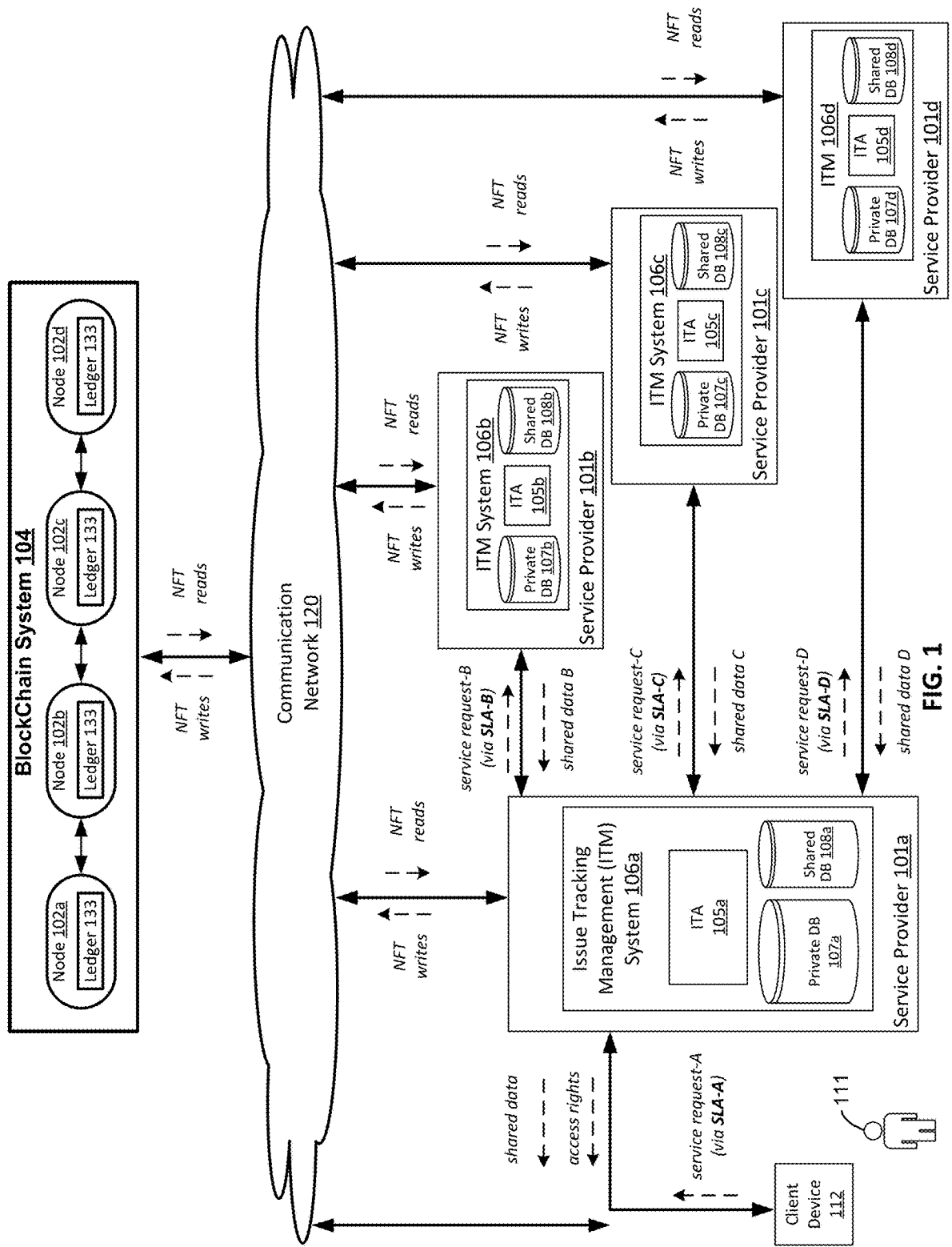
FIG. 1 is a block diagram depicting an example environment for creating decentralized multi-party traceability of service-level agreements (SLAs) using a blockchain, according to some embodiments.

When providing support or services to customers, any of the parties involved may distrust the timestamp or content in the support/service log interactions, especially when the Service Level Agreement (SLA) is not being achieved. In those cases where more than one party is involved, problems may arise when one party (e.g., company, vendor, entity) does not comply with the inter-party support SLA because that will affect the SLA provided by another party.

Not reaching the agreed terms of the SLA could result in monetary or other forms of compensation. That is, when more than one party is involved, the party providing the service will be subject to pay those compensation even if the problem is not specifically attached to them. When support involves more than one product, it is a typical for the parties to engage in the "blame game," where one party states that the other party needs to deliver some specific fix or information or goods, while the other states the same from the previous one. Thus, there is a long felt need to solve the problem related to ensuring that all the parties associated with a particular party's ability to perform according to the terms of an SLA each have the same information, and that it is not possible to tamper any of the data that represents the exchange of information and responsibility.

Aspects of the present disclosure address the above-noted and other deficiencies by creating decentralized multi-party traceability of service-level agreements (SLAs) using a blockchain. A blockchain stores information about the interactions and timestamps, including any digital and physical artifact that is shared with a customer or any parties involved. That is, the blockchain is accessible for all the parties involved, and all the parties may record their interactions and artifacts in the blockchain. Artifacts, physical or digital, that are exchanged between parties may have an associated Non-Fungible Token (NFT) to assure traceability and non-tampering. The interactions may be ciphered or in the clear. The identification of parties may be also ciphered and/or anonymized. All parties may record in the blockchain the status of providing (e.g., performing) one or more portions of a service according to an SLA, as well as to its own internal status and workflow, which may differ from that of other parties.

In an illustrative embodiment, an issue tracking management (ITM) system receives a service request to provide a service according to a first SLA that is associated with a client. The ITM system generates a first dataset indicating a status that is associated with a first portion of the service. The ITM system identifies, based on the first SLA, a second service provider to provide a second portion of the service according to a second SLA associated with the first service provider. The ITM system retrieves, from a blockchain system based on the second SLA, a non-fungible token (NFT) that is associated with a second dataset indicating a status that is associated with the second portion of the service. The ITM system grants, based on the NFT, access to a client device associated with the client to the first dataset and the second dataset.

Benefits of the embodiments of the present disclosure include a mechanism to prevent tampering with private datasets associated with SLAs, which in turn, improves the computing support and trust between the parties of the SLAs. By preventing tampering of private datasets, the embodiments of the present disclosure can also protect the datasets from malicious misuse by bad actors which can result in a wastage of computing resources (e.g., memory resources, power resources, processing resources, networking resources) of the computing environment. Furthermore, using NFTs also allows the decentralized multi-party traceability of SLAs even when legacy, non-blockchain-based systems, are involved.

FIG. 1 is a block diagram depicting an example environment for creating decentralized multi-party traceability of service-level agreements (SLAs) using a blockchain, according to some embodiments. The environment 100 includes a blockchain system 104, a plurality of issue tracking management (ITM) systems 106 (e.g., ITM system 106a, ITM system 106b, ITM system 106c, ITM system 106d), and a client device 112 that are each communicably coupled together via the communication network 120. Each of the ITM systems 106 is managed (e.g., controlled, operated) by a service provider 101. Specifically, the service provider 101a manages the ITM system 106a, the service provider 101b manages ITM system 106b, the service provider 101c manages the ITM system 106c, and the service provider 101d manages ITM system 106d.

Each ITM system 106 executes an issue tracking agent (ITA) 105. Specifically, the ITM system 106a executes an ITA 105a, the ITM system 106b executes an ITA 105b, the ITM system 106c executes an ITA 105c, the ITM system 106d executes an ITA 105d. As discussed below, the ITA 105 is configured to create decentralized multi-party traceability of service-level agreements (SLAs) using a blockchain.

The blockchain system 104 includes nodes 102a, 102b, 102c, and 102d (collectively referred to as, "nodes 102") that are communicably connected with one another via a communication network (e.g., same as or different from communication network 120) to form a peer-to-peer network (sometimes referred to as, "distributed ledger technology (DLT) network"). Each of the nodes 102 of the blockchain system 104 use a ledger 133 to record transactions (e.g., transmitting messages, processing messages, results of actions, etc.) that are executed in the blockchain system 104. As shown in FIG. 1, each of the nodes 102 store (e.g., includes) a copy of the ledger 133. Each node 102 may broadcast (e.g., transmit, send) a copy of their ledger 133 to one or more of the neighboring nodes in the blockchain system 104 to ensure that each node in the blockchain system 104 may be able to validate the transactions that occur in the blockchain system 104 via a set of consensus rules.

Each ledger 133 (e.g., a distributed ledger) includes a plurality of blocks which are linked together and are secured using cryptographic functions. For example, each block may include a hash (e.g., hash code) of the previous block, a timestamp, and other data (e.g., a copy of the message, a result, a non-fungible token (NFT), etc.). In some embodiments, an NFT may include a dataset (e.g., public dataset) that indicates the status (e.g., completion status, progress status, etc.) that is associated with one or more portions of a service. In some embodiments, an NFT may include a reference to a dataset that indicates the status that is associated with one or more portions of a service, where the dataset is stored on a database that is separate from the blockchain system 104.

A node 102 may generate a hash using a hash function (e.g., SHA-256), which takes a key as an input that is associated with a datum or record and used to identify it to a data storage and/or retrieval application. The keys may be a fixed length (e.g., an integer), a variable length (e.g., a name), or the datum itself. The output is a hash used to index a hash table holding the data or records, or pointers to them.

A node 102, an ITM system 106, and the client device 112 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

A node 102, an ITM system 106, and the client device 112 may each be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.).

The blockchain system 104 may use the same type or different types of virtual environments. For example, all of the nodes 102 of the blockchain system 104 may be VMs. In another example, all of the nodes 102 may be containers. In a further example, some of the nodes 102 may be VMs, other nodes 102 may be containers, and other nodes may be computing devices (or groups of computing devices).

In one embodiment, the blockchain system 104 may be a permissioned blockchain. A permissioned blockchain may be a blockchain where the nodes 102 are authenticated or given permission to be included in the blockchain system 104. For example, the nodes 102 may have been previously verified or authenticated with an administrator or an administrative group that manages or oversees the blockchain system 104. This may indicate that each of the nodes 102 are trusted by the blockchain system 104 and thus security requirements or operations for accessing the ledger 133 that may generally be used in blockchain systems, may be relaxed or reduced. For example, the computational task (e.g., a computational challenge) for creating new entries may be removed or the complexity of the computational task may be reduced.

In another embodiment, the blockchain system 104 may be a permission-less blockchain. A permission-less blockchain may be a blockchain where the nodes 102 are not previously authenticated or given permission to be included in the blockchain system. Thus, any node (e.g., any computing device, any server computer, etc.) may join the blockchain system and attempt to create entries in the ledger 133.

The blockchain system 104 may reach a consensus (e.g., a majority agreement) about the ledger 133 (e.g., the content of the ledger 133 or the content of the entries) using various functions, algorithms, operations, etc. For example, a Byzantine fault tolerance algorithm may be used by the nodes 102 to reach a consensus if different nodes have different versions of the ledger 133. In another example, the nodes 102 may rotate between each other when creating entries in the ledger 133. For example, after a period of time has passed, a node 102 that has not written to the ledger 133 may be allowed to create an entry in the ledger 133. This may be referred to as a proof of time or a proof of elapsed time system to allow nodes to update the ledger 133. In a further example, the nodes 102 may also provide collateral to be allowed to update the ledger 133. For example, an entity, company, organization, service provider, etc., that owns or manages the nodes 102 may pay a deposit to be allowed to be included in the blockchain system 104 and to access the ledger 133. The entity may be able to get the deposit back if the entity does not perform unauthorized or inappropriate operation/actions. For example, if the entity does not attempt to add incorrect information to the ledger 133, the entity may obtain a reward for its participation in maintaining and updating the ledger's information and may be able to recoup the deposit if the entity no longer wants to participate in the blockchain system 104. If the entity does attempt to add incorrect information to the ledger 133, the entity may lose the deposit. This may be referred to as a proof of stake system.

A node 102 may be a normal node or as a master node. While a normal node and a master node may both be electronic computing devices, a master node (sometimes referred to as, "a super node") may differ from a normal node in that a master node may have more computing resources (e.g., computing power, memory resources, networking bandwidth, storage space, etc.) than a normal node. Next to validating, saving and broadcasting transactions (which are the same operations performed by a normal node), a master node may also facilitate other events in the blockchain system 104 (or in a DLT network), such as governing voting events, providing execution of protocol operations, and enforcing the rules and/or laws of the corresponding blockchain system. Unlike a normal node, a master node may also maintain a constant, active connection with one or more nodes in the blockchain system. As such, a master node, in some embodiments, may consume more resources (e.g., electricity, up-time, maintenance, storage space, memory) than a normal node.

Each of the ITM systems 106 includes a private database 107 for storing a private dataset (sometimes referred to as, second dataset) that indicates a status (e.g., a completion status, a progress status) of the tasks, cost, timelines and/or workflows for providing one or more portions (e.g., tasks, jobs, activities) of a service according to an SLA. Specifically, the ITM system 106 includes a private database 107a, the ITM system 106b includes a private database 107b, the ITM system 106c includes a private database 107c, and the ITM system 106d includes a private database 107d.

Each of the ITM systems 106 includes a shared database 108 for storing a shared dataset (sometimes referred to as, first dataset) that indicates a shared status of the tasks, cost, timelines and/or workflows for providing one or more portions of a service according to an SLA. Specifically, the ITM system 106a includes a shared database 108a, the ITM system 106b includes a private database 107b, the ITM system 106c includes a private database 107c, and the ITM system 106d includes a private database 107d. Each of the ITM systems 106 generate their shared datasets based on the one or more private datasets that are stored in their respective private database 107.

In some embodiments, a shared dataset includes none of the corresponding private dataset that the ITM system 106 used to generate the shared dataset. In some embodiments, a shared dataset includes some or all the corresponding private dataset that the ITM system 106 used to generate the shared dataset.

Each service provider 101 is in an SLA with the client device 112 and/or one or more service providers 101. As shown in FIG. 1, a client 111 of client device 112 is in service-level agreement "A" (SLA-A) with the ITM system 106a, where the terms of the SLA-A require for the service provider 101a to provide a first service to the client 111. The service provider 101b is in service-level agreement "B" (SLA-A) with the service provider 101b, where the terms of the SLA-B require for the service provider 101b to provide a second service (e.g., a new water pipe) to the service provider 101a. The service provider 101c is in service-level agreement "C" (SLA-C) with the service provider 101c, where the terms of the SLA-C require for the service provider 101c to provide a second service (e.g., turn electricity OFF/ON) to the service provider 101a. The service provider 101d is in service-level agreement "D" (SLA-D) with the service provider 101d, where the terms of the SLA-D require for the service provider 101d to provide a third service (e.g., road repair) to the service provider 101a.

In some embodiments, the client 112 and/or the service provider 101 may each be a private party (e.g., an individual, private organization), a public party (e.g., organization), or a government entity (e.g., government agency or department). In some embodiments, an SLA may involve a monetary exchange between the client 112 and the service provider 101 and/or an exchange of services to one another.

The ability for the service provider 101a to provide the first service to the client 111 may depend on whether one or more of the other services providers (e.g., service provider 101b-101d) provide the services to the service provider 101a according to their respective SLAs. For example, the service provider 101a may be a water company and the client 111 may be a homeowner or a business, where the terms of the SLA-A require for the service provider 101a to provide running water to the client's 111 home. An earthquake could cause the road near the client's 111 home to collapse onto an underground water pipe that is owned by the service provider 101a, which in turn, causes the water to stop flowing to the client's home. Without knowing the reason for the water outage, the client 111 may use the client device 112 to send a first request (shown in FIG. 1 as, service request-A) to the ITM system 106a of the service provider 101a via any type of communication medium (e.g., email, telephone, website) to request for the service provider 101a to resume/provide the service (e.g., running water) to the client's 111 home according to the terms of the SLA-A.

Upon surveying the area outside of the client's 111 home, the service provider 101a may discover that the service provider 101a must replace the damaged water pipe with a new water pipe to resume providing the water supply to the client's 111 home. The service provider 101a may use the ITM system 106a to send a second request (shown in FIG. 1 as, service request-B) to the ITM system 106b of service provider 101b, which is a pipe manufacturer, to request for the service provider 101b to build and send a new water pipe to the service provider 101a, according to the terms of the SLA-B.

The service provider 101a may also discover that the collapsed road must be repaired before the service provider 101a can access and replace the damaged water pipe with the new water pipe. The service provider 101a may use the ITM system 106a to send a third request (shown in FIG. 1 as, service request-C) to the ITM system 106c of service provider 101c, which is the road maintenance department of the local county, to request for the service provider 101c to repair the road, according to the terms of the SLA-C.

The service provider 101a may also discover that the damaged water pipe is near an underground electrical wire which must be disabled before the service provider 101a can safely access and replace the damaged water pipe with the new water pipe. The service provider 101a may use the ITM system 106a to send a fourth request (shown in FIG. 1 as, service request-D) to the ITM system 106d of service provider 101d, which is the electric company, to request for the service provider 101d to disable the electricity, according to the terms of the SLA-D.

As each service provider 101 works to provide the requested service, their respective ITM systems 106 may generate and store one or more private datasets that each indicate a status (e.g., a completion status, a progress status) of the tasks, cost, timelines and/or workflows for providing one or more portions (e.g., tasks, jobs, activities) of the requested service according to their SLAs. For example, the ITM system 106a may generate a private dataset that indicates that the service provider 101a (e.g., water company) sent the service requests to the service providers 101b, 101c, 101d, and store the private dataset in the private database 107a. Subsequently, the ITM system 106b of the service provider 101b (e.g., pipe manufacturer) may generate a private dataset indicating that the service provider 101b will be finished with building the new water pipe in 1 week. A few days later, the ITM system 106c of the service provider 101c (e.g., road maintenance department) may generate a private dataset indicating that the service provider 101c has finished repairing the collapsed road and store the private dataset in the private database 107c. A couple days later, the ITM system 106d of the service provider 101d (e.g., electric company) may generate a private dataset indicating that the service provider 101d has disabled the power to the electrical wire and store the private dataset in the private database 107d. A couple days later, the ITM system 106b of the service provider 101b (e.g., pipe manufacturer) may generate an additional private dataset indicating that the service provider 101b has finished building the new water pipe and shipped the new water pipe to the service provider 101a. The ITM system 106b stores the additional private dataset in the private database 107a.

Each of the ITM systems 106 secure their private databases 107a to make them inaccessible to other ITM systems 106 and client devices 112 by for example, encrypting the private datasets prior to storing the private dataset in the private database 107 and/or denying requests to access the private database 107 from other ITM systems 106 and client devices 112.

However, each ITM system 106 may generate a shared dataset that is accessible to other ITM systems 106 and client devices 112 if the ITM system 106 grants them access. The ITM system 106 generates the shared dataset based on the one or more of the private datasets and stores the shared dataset in their respective shared database 108. For example, although the ITM system 106a generates a private dataset that indicates that the service provider 101a (e.g., water company) sent the service requests to the service providers 101, 101c, 101d, the service provider 101 may not want to reveal any of the details of the SLAs to the client 111, which may be included in the service requests. Therefore, the ITM system 106a of the service provider 101a may determine, based on the private datasets, that the service providers 101b-101d will be able to provide their services to the service provider 101a no later than 1 week, and that it will take the service provider 101a an additional 3 days to replace the damaged water pipe with the new water pipe. Upon making this determination, the ITM system 106a may generate a shared dataset indicating that the service provider 101a will provide the service (e.g., running water) to the client's 111 home within 10 days (e.g., 1 week+3 days). The ITM system 106a stores the shared dataset in the shared database 108a.

Each ITM system 106 may record in the blockchain 104 the status of the service request. For example, the ITM system 106a may generate an NFT that includes its shared dataset or a reference to the dataset that is stored in the shared database 108c, and store the NFT on the blockchain system 104. The ITM system 106b may generate an NFT that includes its shared dataset or a reference to the dataset that is stored in the shared database 108b, and store the NFT on the blockchain system 104. The ITM system 106c may generate an NFT that includes its shared dataset or a reference to the dataset that is stored in the shared database 108c, and store the NFT on the blockchain system 104. The ITM system 106d may generate an NFT that includes its shared dataset or a reference to the dataset that is stored in the shared database 108d, and store the NFT on the blockchain system 104.

The ITM system 106a may retrieve the one or more shared datasets that are stored in the shared databases 108 of the other ITM systems 106 by retrieving their NFTs from the blockchains 104, and storing the one or more shared datasets in its shared database 108a along with its own shared dataset. The ITM system 106a may then generate its own NFT that includes its shared dataset and the other shared datasets, and store the NFT on the blockchain 104. Alternatively, the ITM system 106a may generate its own NFT that includes a reference to its shared dataset and the other shared datasets that are stored in its shared database 108a, and store the NFT on the blockchain 104.

The ITM system 106a may send a ticket (sometimes referred to as, access rights) to the client device 112, which the client device 112 may use to retrieve the shared datasets (including any of the other shared datasets) from the shared database 108a.

Still referring to FIG. 1, the ITM system 106a of the service provider 101a receives a service request to provide a service according to a first SLA that is associated with the client 111. The ITM system 106 generates a first dataset indicating a status that is associated with a first portion of the service. The ITM system 106a identifies, based on the first SLA, a second service provider 101b to provide a second portion of the service according to a second SLA associated with the service provider 101a. The ITM system 106a retrieves, from the blockchain system 104 based on the second SLA, a non-fungible token (NFT) that is associated with a second dataset indicating a status that is associated with the second portion of the service. The ITM system 106a grants, based on the NFT, access to a client device 112 associated with the client 111 to the first dataset and the second dataset.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

The client device 112 and the ITM systems 106 may each communicate with one another via the communication network 120.

In some embodiments, the nodes 102 of the blockchain system 104 may be included in the one or more of the service providers 101. This arrangement is sometimes referred to as a ring topology.

Although FIG. 1 shows only a select number of blockchain systems (e.g., blockchain system 104) and computing devices (e.g., blockchain system 104, client device 112, ITM system 106); the environment 100 may include any number of blockchain systems and computing devices that are interconnected in any arrangement to facilitate the exchange of data between the blockchain systems and computing devices.

Figure 2B:
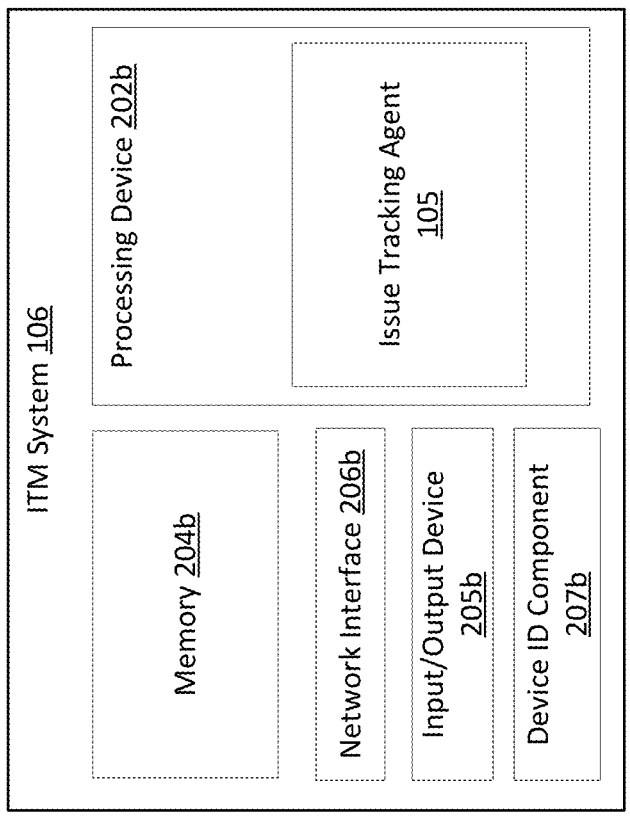
FIG. 2B is a block diagram depicting an example of the issue tracking management (ITM) system 106 of the environment in FIG. 1, according to some embodiments.
Figure 2A:
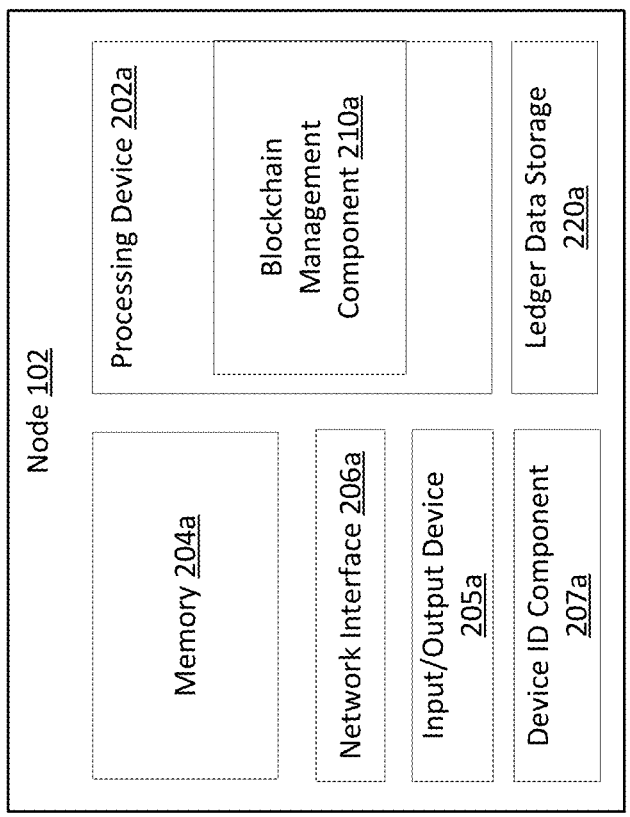
FIG. 2A is a block diagram depicting an example node 102 in FIG. 1, according to some embodiments.

FIG. 2A is a block diagram depicting an example node 102 in FIG. 1, according to some embodiments. While various devices, interfaces, and logic with particular functionality are shown, it should be understood that the ITM system 106 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The ITM system 106 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the ITM system 106. In some embodiments, the processing device 202a and the memory 204a form various processing devices and/or circuits described with respect to the ITM system 106 The instructions include code from any suitable computer programming language such as, but not limited to, C, C++, C #, Java, JavaScript, VBScript, Perl, HTML, XML, Python, TCL, and Basic.

The node 102 includes a ledger data storage 220a configured to store the ledger 133 (or copies thereof). The ledger data storage 220a may be a persistent storage, such that the ledger data storage 220 retains the data (e.g., ledger 133) even after power to the data storage is shut off. A persistent storage may be one or more devices that are capable of storing data. A persistent storage may be a local storage unit or a remote storage unit. Persistent storage may be a magnetic storage unit, optical storage unit, solid state storage unit, electronic storage units (main memory, cache, random access memory (RAM)), or similar storage unit. Persistent storage may also be a monolithic/single device or a distributed set of devices. In some embodiments, the node 102 may store the ledger (or copies thereof) in the memory 204a.

The processing device 202a executes a blockchain management component 210. In some embodiments, the blockchain management component 210 may be configured to store an NFT on the blockchain 104. For example, the blockchain management component 210 may be configured to update the ledger 220a based on a request (shown in FIG. 1 as, NFT writes) to update the ledger 22a to indicate an NFT associated with a dataset. In some embodiments, the NFT may include one or more datasets (e.g., public dataset), where each dataset indicates a status (e.g., completion status, progress status, etc.) that is associated with one or more portions of a service and/or a reference (e.g., a link, a pointer) to the dataset.

The node 102 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the node 102 includes a plurality of network interfaces 206a of different types, allowing for connections to a variety of networks, such as local area networks (public or private) or wide area networks including the Internet, via different sub-networks.

The node 102 includes an input/output device 205a configured to receive user input from and provide information to a user. In this regard, the input/output device 205a is structured to exchange data, communications, instructions, etc. with an input/output component of the node 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the node 102, such as a built-in display, touch screen, microphone, etc., or external to the housing of the node 102, such as a monitor connected to the node 102, a speaker connected to the node 102, etc., according to various embodiments. In some embodiments, the node 102 includes communication circuitry for facilitating the exchange of data, values, messages, and the like between the input/output device 205a and the components of the node 102. In some embodiments, the input/output device 205a includes machine-readable media for facilitating the exchange of information between the input/output device 205a and the components of the node 102. In still another embodiment, the input/output device 205a includes any combination of hardware components (e.g., a touchscreen), communication circuitry, and machine-readable media.

The node 102 includes a device identification component 207a (shown in FIG. 2A as device ID component 207a) configured to generate and/or manage a device identifier associated with the node 102. The device identifier may include any type and form of identification used to distinguish the node 102 from other computing devices. In some embodiments, to preserve privacy, the device identifier may be cryptographically generated, encrypted, or otherwise obfuscated by any device and/or component of the node 102. In some embodiments, the node 102 may include the device identifier in any communication (e.g., public encrypted message, private encrypted message, etc.) that the node 102 sends to a computing device.

The node 102 includes a bus (not shown), such as an address/data bus or other communication mechanism for communicating information, which interconnects the devices and/or components of node 102, such as processing device 202a, network interface 206a, input/output device 205a, and/or device ID component 207a.

In some embodiments, some or all of the devices and/or components of node 102 may be implemented with the processing device 202a. For example, the node 102 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the issue tracking management (ITM) system 106 of the environment in FIG. 1. While various devices, interfaces, and logic with particular functionality are shown, it should be understood that the ITM system 106 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The ITM system 106 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the ITM system 106 instead of devices and/or components of the node 102.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the ITM system 106 instead of devices and/or components of the node 102.

The processing device 202b may execute an issue tracking agent 105 that is configured to receive a service request to provide a service according to a first service-level agreement (SLA) associated with the client 111. The issue tracking agent 105 may be configured to generate a first dataset indicating a status associated with a first portion of the service. The issue tracking agent 105 may be configured to identify, based on the first SLA, a second service provider (e.g., service provider 101b) to provide a second portion of the service according to a second SLA. The issue tracking agent 105 may be configured to retrieve, from the blockchain system 104 (e.g., ledger data storage 220a) based on the second SLA, a non-fungible token (NFT) associated with a second dataset indicating a status associated with the second portion of the service. The issue tracking agent 105 may be configured to grant, by a processing device of a first service provider based on the NFT, access to the client device 112 associated with the client 111 to the first dataset and the second dataset.

In some embodiments, there could be an NFT associated with the first portion of the service. For example, the first service provider (e.g., service provider 101a) might want to record when the request was placed (e.g., "I'm asking for this on Monday 10.30 am"). As another example, the second service provider (e.g., service provider 101b) might want to record when the request was placed by the first service provider (e.g., "you asked for this on Monday 10.30 am").

The issue tracking agent 105 may be configured to trigger the second service provider to provide the second portion of the service according to the second SLA and update a ledger (e.g., ledger data storage 220a) of the blockchain system 104 to indicate the NFT associated with the second dataset. In some embodiments, to trigger the second service provider, the issue tracking agent 105 sends, to the second service provider, a second service request to provide the service according to the second SLA. In some embodiments, to trigger the second service provider, the issue tracking agent 105 generates an additional NFT associated with the first dataset indicating the status associated with the first portion of the service, and updates the ledger of the blockchain system to indicate the additional NFT.

The issue tracking agent 105 may be configured to extract, from the NFT, the second dataset indicating the status associated with the second portion of the service. The issue tracking agent 105 may be configured to extract, from the NFT, a reference to the second dataset indicating the status associated with the second portion of the service, and retrieve, from a shared database of the second service provider using the NFT, the second dataset indicating the status associated with the second portion of the service. In some embodiments, the second dataset includes a first timestamp indicating a generation time of the second dataset by the second service provider and a second timestamp indicating a retrieval time of the second dataset by the first service provider.

In some embodiments, the issue tracking agent 105 may be configured to indirectly retrieve data from the shared database. For example, the issue tracking agent 105 may use an application programming interface (API) that is configured to access the shared database. That is, the issue tracking agent 105 may directly send a retrieval request to the shared database, or may send a retrieval request to the API, which causes the API to access the shared database. The same may be true for storage. For example, the data retrieval may take place indirectly through an API instead of direct reads/writes onto a shared database.

The issue tracking agent 105 may be configured to grant the access to the client device 112 to the first dataset and the second dataset by acquiring, using the NFT, the second dataset indicating the status associated with the second portion of the service; storing the first dataset and the second dataset in a shared database of the first service provider; and granting, to the client device 112, access to the shared database of the first service provider.

The issue tracking agent 105 may be configured to cipher at least one of the first dataset or the second dataset prior to storing the first dataset and the second dataset in a shared database of the first service provider.

The issue tracking agent 105 may be configured to generate a private dataset inaccessible by the client 111 and indicating an internal workflow associated with the first portion of the service. In some embodiments, the issue tracking agent 105 generates the first dataset indicating the status associated with the first portion of the service based on the private dataset. In some embodiments, the NFT includes one or more of an identifier to the first service provider, an identifier to the second service provider, and an identifier to the client device 112.

The ITM system 106 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the ITM system 106 instead of devices and/or components of the node 102.

The ITM system 106 includes an input/output device 205b configured to receive user input from and provide information to a user. In this regard, the input/output device 205b is structured to exchange data, communications, instructions, etc. with an input/output component of the ITM system 106. The input/output device 205b includes identical or nearly identical functionality as input/output device 205a in FIG. 2A, but with respect to devices and/or components of the ITM system 106 instead of devices and/or components of the node 102.

The ITM system 106 includes a device identification component 207b (shown in FIG. 2B as device ID component 207b) configured to generate and/or manage a device identifier associated with the ITM system 106. The device ID component 207b includes identical or nearly identical functionality as device ID component 207a in FIG. 2A, but with respect to devices and/or components of the ITM system 106 instead of devices and/or components of the node 102.

The ITM system 106 includes a bus (not shown), such as an address/data bus or other communication mechanism for communicating information, which interconnects the devices and/or components of the ITM system 106, such as processing device 202b, network interface 206b, input/output device 205b, and/or device ID component 207b.

In some embodiments, some or all of the devices and/or components of host machine 115 may be implemented with the processing device 202b. For example, the ITM system 106 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

FIG. 2C is a block diagram depicting an example environment for using an ITM system, according to some embodiments. The processing device 202c of a first service provider 201c is operatively coupled to the memory 204c. The processing device 202c (e.g., an ITM system 106 in FIG. 1) receives a service request 250c to provide a service 242c according to a first service-level agreement (SLA) 240c associated with a client 212c. The processing device 202c generates a first dataset 260c indicating a status 272c associated with a first portion 243c (tasks, jobs, activities, interactions) of the service 242c. The processing device 202c identifies, based on the first SLA 240c, a second service provider 271c to provide a second portion 244c (tasks, jobs, activities, interactions) of the service 242c according to a second SLA 270c. The processing device 202c retrieves, from a blockchain system 280c (e.g., blockchain system 104 in FIG. 1) based on the second SLA 270c, a non-fungible token (NFT) 273c associated with a second dataset 281c indicating a status 274c associated with the second portion 244c of the service 242c. The processing device 202c grants, based on the NFT 273c, access to a client device 213c associated with the client 212c to the first dataset 260c and the second dataset 281c.

In some embodiments, one or more of the portions of a service are not subject to or associated with an SLA, but instead, just provide additional information. For example, the service provider 101a could communicate to service provider 101c a message indicating, "even though we asked for a pipe of type X in our initial interaction, pipes of type Y or Z may also be valid if they are within price and can be served earlier."

FIG. 3 is a flow diagram depicting a method of creating decentralized multi-party traceability of service-level agreements (SLAs) using a blockchain, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by an issue tracking management system, such as ITM system 106 in FIG. 1. In some embodiments, method 300 may be performed by one or more nodes of a blockchain system, such as nodes 102a, node 102b, node 102c, and/or node 102d of blockchain system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving a service request to provide a service according to a first service-level agreement (SLA) associated with a client. The method 300 includes the block 304 of generating a first dataset indicating a status associated with a first portion of the service. The method 300 includes the block 306 of identifying, based on the first SLA, a second service provider to provide a second portion of the service according to a second SLA. The method 300 includes the block 308 of acquiring behavioral data indicative of the real-time behavior of the user-function. The method 300 includes the block 310 of granting, by a processing device of a first service provider based on the NFT, access to a client device associated with the client to the first dataset and the second dataset.

Figure 4:
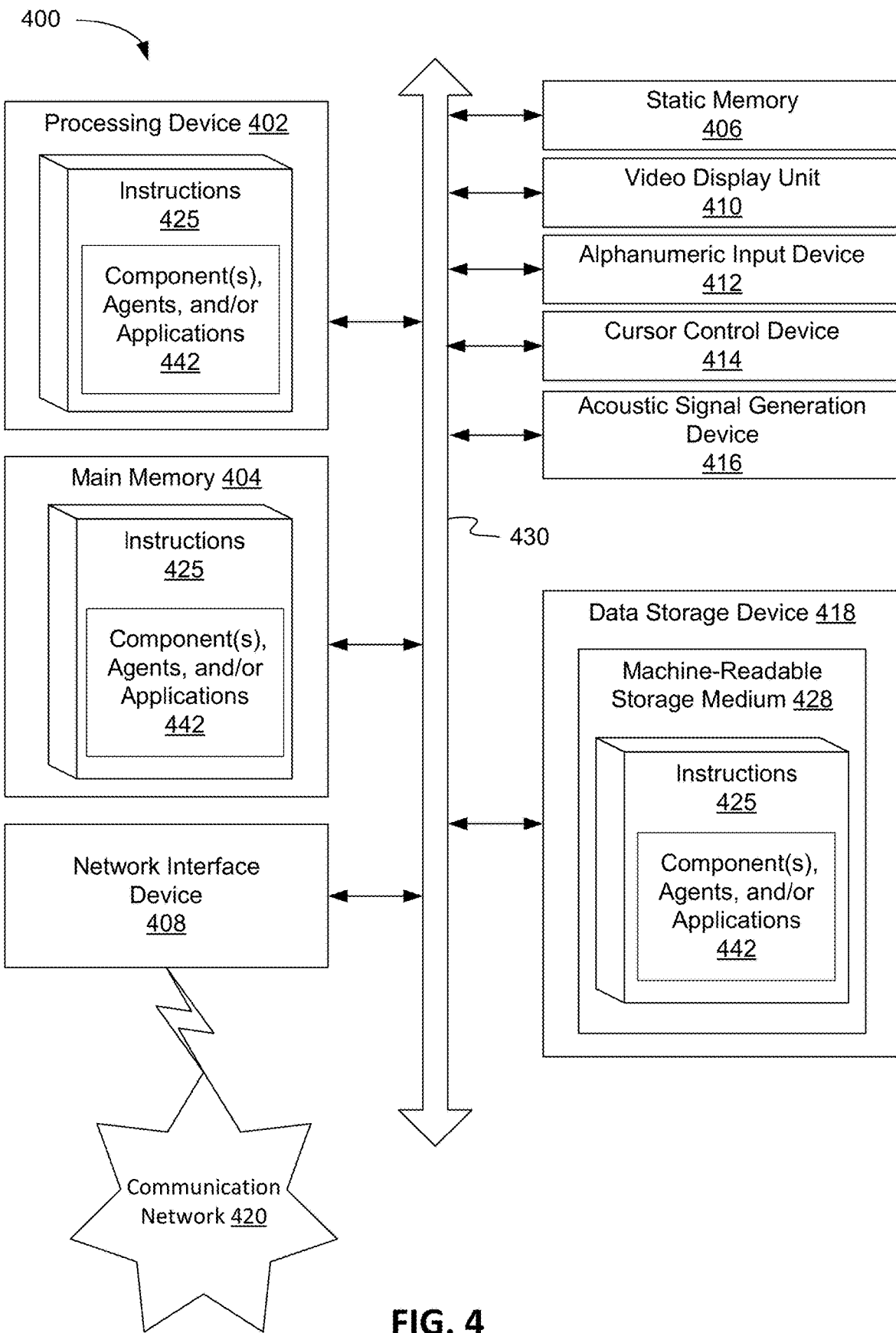
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components, agents, and/or applications 442 (e.g., blockchain management component 210a, issue tracking agent 105 in FIG. 2A) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "generating," "identifying," "retrieving," "granting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method performed by a first service provider, the method comprising:
    receiving a service request to provide a service according to a first service-level agreement (SLA) associated with a client device;
    generating a first private dataset inaccessible by the client device and indicating a first status and a first completion time associated with a first portion of the service;
    identifying, based on the first SLA, a second service provider to provide a second portion of the service according to a second SLA;
    retrieving, from a blockchain system based on the second SLA, a non-fungible token (NFT) associated with a second private dataset inaccessible by the client device and indicating a second status and second completion time associated with the second portion of the service, wherein the second private dataset comprises a first timestamp indicating a generation time of the second private dataset by the second service provider and a second timestamp indicating a retrieval time of the second private dataset by the first service provider;
    calculating, based on the first completion time associated with the first portion of the service and the second completion time associated with the second portion of the service, a final completion time associated with the first portion and the second portion of the service;
    generating a first dataset indicating the final completion time without revealing the first status and the second status;
    granting, by a processing device of the first service provider based on the NFT, access to the client device to the first dataset;
    extracting, from the NFT, a reference to the second private dataset indicating the second status associated with the second portion of the service; and
    retrieving, from a shared database of the second service provider using the NFT, the second private dataset indicating the second status associated with the second portion of the service.

2. The method of claim 1, further comprising:
    triggering the second service provider to provide the second portion of the service according to the second SLA and update a ledger of the blockchain system to indicate the NFT.

3. The method of claim 2, wherein triggering the second service provider comprises:
    sending, to the second service provider, a second service request to provide the service according to the second SLA.

4. The method of claim 2, wherein triggering the second service provider comprises:
    generating an additional NFT associated with the first dataset indicating the first status associated with the first portion of the service; and
    updating the ledger of the blockchain system to indicate the additional NFT.

5. The method of claim 1, further comprising:
    extracting, from the NFT, the second private dataset indicating the second status associated with the second portion of the service.

6. The method of claim 1, wherein granting the access to the client device to the first dataset and the second private dataset comprises:
    acquiring, using the NFT, the second private dataset indicating the second status associated with the second portion of the service;
    storing the first dataset and the second private dataset in the shared database of the first service provider; and
    granting, to the client device, access to the shared database of the first service provider.

7. The method of claim 1, further comprising:
    ciphering at least one of the first dataset or the second private dataset prior to storing the first dataset and the second private dataset in a shared database of the first service provider.

8. The method of claim 1, wherein the NFT comprises:
    an identifier to the first service provider,
    an identifier to the second service provider, and
    an identifier to the client device.

9. A system comprising:
    a memory; and
    a processing device of a first service provider, the processing device is operatively coupled to the memory, to:
        receive a service request to provide a service according to a first service-level agreement (SLA) associated with a client device;

generate a first private dataset inaccessible by the client device and indicating a first status and a first completion time associated with a first portion of the service;

identify, based on the first SLA, a second service provider to provide a second portion of the service according to a second SLA;

retrieve, from a blockchain system based on the second SLA, a non-fungible token (NFT) associated with a second private dataset inaccessible by the client device and indicating a second status and second completion time associated with the second portion of the service, wherein the second private dataset comprises a first timestamp indicating a generation time of the second private dataset by the second service provider and a second timestamp indicating a retrieval time of the second private dataset by the first service provider;

calculate, based on the first completion time associated with the first portion of the service and the second completion time associated with the second portion of the service, a final completion time associated with the first portion and the second portion of the service;

generate a first dataset indicating the final completion time without revealing the first status and the second status;

grant, based on the NFT, access to the client device to the first dataset;

extract, from the NFT, a reference to the second private dataset indicating the second status associated with the second portion of the service; and retrieve, from a shared database of the second service provider using the NFT, the second private dataset indicating the second status associated with the second portion of the service.

10. The system of claim 9, wherein the processing device is further to:

trigger the second service provider to provide the second portion of the service according to the second SLA and update a ledger of the blockchain system to indicate the NFT.

11. The system of claim 10, wherein to trigger the second service provider, the processing device is further to:

send, to the second service provider, a second service request to provide the service according to the second SLA.

12. The system of claim 10, wherein to trigger the second service provider, the processing device is further to:

generate an additional NFT associated with the first dataset indicating the status associated with the first portion of the service; and update the ledger of the blockchain system to indicate the additional NFT.

13. The system of claim 9, wherein to grant the access to the client device to the first dataset and the second private dataset, the processing device is further to:

acquire, using the NFT, the second private dataset indicating the status associated with the second portion of the service;

store the first dataset and the second private dataset in the shared database of the first service provider; and grant, to the client device, access to the shared database of the first service provider.

14. A non-transitory computer-readable medium storing instructions that, when executed by a processing device of a first service provider, cause the processing device to:

receive a service request to provide a service according to a first service-level agreement (SLA) associated with a client device;

generate a private dataset inaccessible by the client device and a status and a first completion time associated with a first portion of the service;

identify, based on the first SLA, a second service provider to provide a second portion of the service according to a second SLA;

retrieve, from a blockchain system based on the second SLA, a non-fungible token (NFT) associated with a second private dataset inaccessible by the client device and indicating a second status and a second completion time associated with the second portion of the service, wherein the second private dataset comprises a first timestamp indicating a generation time of the second private dataset by the second service provider and a second timestamp indicating a retrieval time of the second private dataset by the first service provider;

calculate, based on the first completion time associated with the first portion of the service and the second completion time associated with the second portion of the service, a final completion time associated with the first portion and the second portion of the service;

generate a first dataset indicating the final completion time without revealing the first status and the second status;

grant, by the processing device based on the NFT, access to the client device to the first dataset;

extract, from the NFT, a reference to the second private dataset indicating the second status associated with the second portion of the service; and retrieve, from a shared database of the second service provider using the NFT, the second private dataset indicating the second status associated with the second portion of the service.

* * * * *